United States Patent
Zhang et al.

(10) Patent No.: US 10,133,368 B2
(45) Date of Patent: Nov. 20, 2018

(54) UNDO OPERATION FOR INK STROKE CONVERSION

(71) Applicant: Lenovo (Singapore) Pte. Ltd., Singapore (SG)

(72) Inventors: Jianbang Zhang, Cary, NC (US); Steven Richard Perrin, Raleigh, NC (US); Russell Speight VanBlon, Raleigh, NC (US); Joshua Neil Novak, Wake Forest, NC (US); Bradley Park Strazisar, Cary, NC (US); Sarah Jane E Cox, Raleigh, NC (US); John Weldon Nicholson, Cary, NC (US); Jonathan Jen-Wei Yu, Raleigh, NC (US); Aaron Michael Stewart, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 154 days.

(21) Appl. No.: 14/581,122

(22) Filed: Dec. 23, 2014

(65) Prior Publication Data

US 2016/0179224 A1 Jun. 23, 2016

(51) Int. Cl.
| | | |
|---|---|---|
| *G06F 3/0354* | (2013.01) | |
| *G06F 3/0488* | (2013.01) | |
| *G06F 17/24* | (2006.01) | |
| *G06K 9/00* | (2006.01) | |
| *G06K 9/22* | (2006.01) | |

(52) U.S. Cl.
CPC ...... *G06F 3/03545* (2013.01); *G06F 3/04883* (2013.01); *G06F 17/242* (2013.01); *G06K 9/00436* (2013.01); *G06K 9/222* (2013.01)

(58) Field of Classification Search
CPC .................................................. G06F 3/04883
See application file for complete search history.

(56) References Cited

U.S. PATENT DOCUMENTS

| | | | |
|---|---|---|---|
| 2006/0077188 A1* | 4/2006 | Byun | G06F 3/0425 345/179 |
| 2014/0219564 A1* | 8/2014 | Demiya | G06F 3/04883 382/189 |

\* cited by examiner

*Primary Examiner* — Hang Lin
(74) *Attorney, Agent, or Firm* — Ference & Associates LLC

(57) ABSTRACT

One embodiment provides a method, including: accepting, at an input and display device, an ink stroke provided to an input overlay application; providing a display of the ink stroke on the input and display device; converting the ink stroke input into a converted input for an underlying application; providing the converted input to the underlying application; detecting a user input associated with the converted input; and reverting to the ink stroke on the input and display device. Other embodiments are described and claimed.

20 Claims, 4 Drawing Sheets

UNDO OPERATION FOR INK STROKE CONVERSION

BACKGROUND

Information handling devices ("devices"), for example cell phones, smart phones, tablet devices, laptop computers, and the like permit users to input handwriting using a finger or pen/stylus. This allows users to write more naturally and without the use of a keyboard.

Conventionally a handwriting field, box or pane is presented to the user as an overlay, e.g., a rectangle in a lower portion of a touch screen display. In this area the user may provide input handwriting strokes, e.g., letters, numbers, characters, symbols, etc. The device employs software that uses the input handwriting strokes, which are generally presented on screen to provide visual feedback to the user, as input by converting the handwriting stroke input locations on the touch screen into machine text according to the language setting of the device. Alternatively, a graphic or image of handwriting input may be placed into an underlying application, e.g., an image of the user's signature.

BRIEF SUMMARY

In summary, one aspect provides a method, comprising: accepting, at an input and display device, an ink stroke provided to an input overlay application; providing a display of the ink stroke on the input and display device; converting the ink stroke input into a converted input for an underlying application; providing the converted input to the underlying application; detecting a user input associated with the converted input; and reverting to the ink stroke on the input and display device.

Another aspect provides an electronic device, comprising: an input and display device; a processor operatively coupled to the input and display device; and a memory that stores instructions executable by the processor to: accept, at the input and display device, an ink stroke provided to an input overlay application; provide a display of the ink stroke on the input and display device; convert the ink stroke input into a converted input for an underlying application; provide the converted input to the underlying application; detect a user input associated with the converted input; and revert to the ink stroke on the input and display device.

A further aspect provides a product, comprising: a storage device having code stored therewith, the code being executable by a processor of an electronic device and comprising: code that accepts, at an input and display device, an ink stroke provided to an input overlay application; code that provides a display of the ink stroke on the input and display device; code that converts the ink stroke input into a converted input for an underlying application; code that provides the converted input to the underlying application; code that detects a user input associated with the converted input; and code that reverts to the ink stroke on the input and display device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
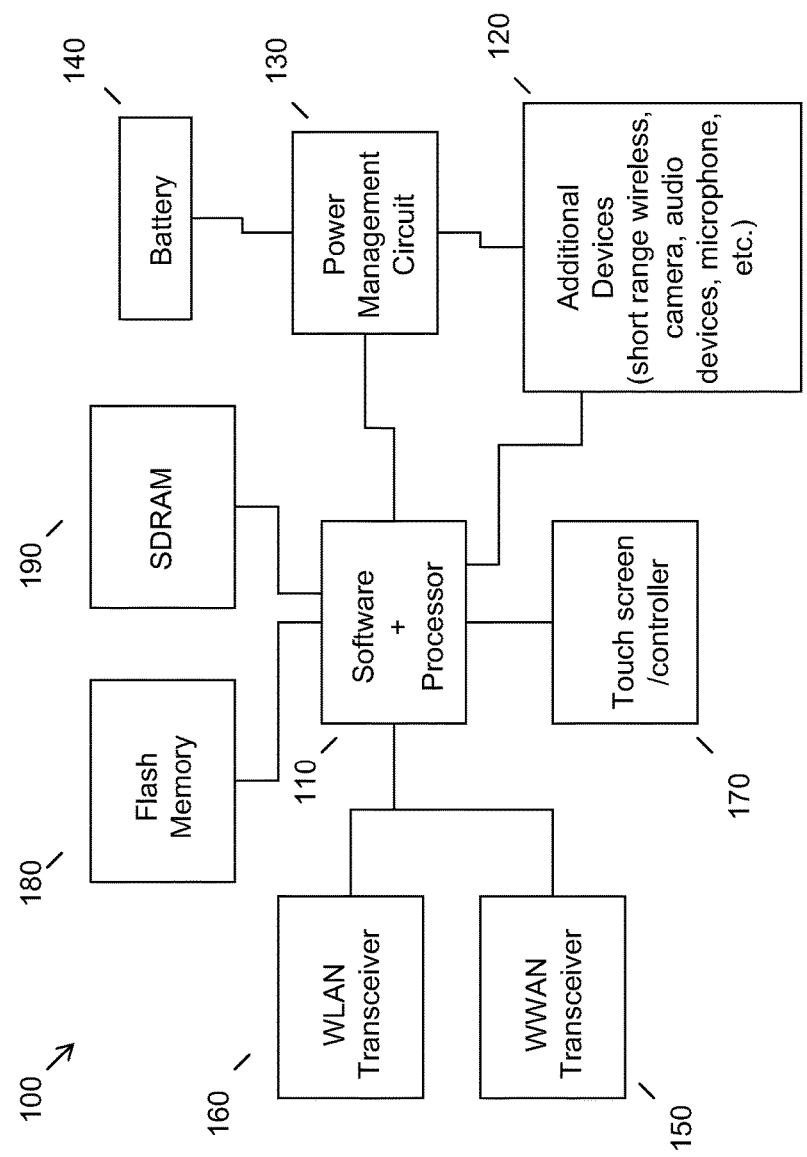
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Using a handwriting input method editor (IME) a user is able to input ink strokes that are converted into text or graphics for insertion into an underlying application. If the user should make a mistake or otherwise wish to change or reverse the input, he or she must currently delete the input. In other words, current IMEs do not provide an "undo" operation such that a user may recover the ink stroke input after it has been converted and inserted into the underlying application. Certain dedicated applications, e.g., Microsoft Corporation's ONE NOTE product, permit reverting to ink strokes, but only within the application itself. Further, the user cannot recover the actual ink strokes, rather machine generated ink strokes (handwriting font) are provided. That is, there does not exist an IME or overlay application (i.e., an application that provides ink input modality for a plurality of applications) that permits a user to revert to the previous ink stroke version of the input.

The technical issue presents problems for a user in that editing opportunities are lost and the user must re-enter ink strokes. If the user were provided with the ability to recover or revert to prior ink strokes, editing the same in-line would be facilitated. This is much more convenient in many scenarios, e.g., where a single letter or character is to be amended.

Accordingly, an embodiment provides an input overlay application that runs as an independent application. The input overlay application converts a user's handwritten ink strokes (provided with a finger tip, pen or stylus, active or passive) into machine usable input, e.g., presented as application typeset or a graphic file, and provides the same to the underlying application (e.g., email application, text messaging application, web browser, etc.).

An embodiment buffers or stores the user's ink strokes such that the same may be reverted to, e.g., in response to an "undo" type operation or input provided by the user. In other words, after the input overlay application has converted and inserted the ink input into the underlying application, the underlying application input (e.g., typeset) may be reverted to ink strokes. This permits the user to be presented with the original ink strokes within the input overlay application. The user may then offer additional ink strokes and/or gestures to the input overlay application. This may take the form of, for example, editing ink strokes or gesture inputs.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included, e.g., a camera, short range wireless devices, a microphone, etc. System 100 often includes a touch screen 170 for data input and display/rendering. System 100 also typically includes various memory devices, for example flash memory 180 and SDRAM 190.

Figure 2:
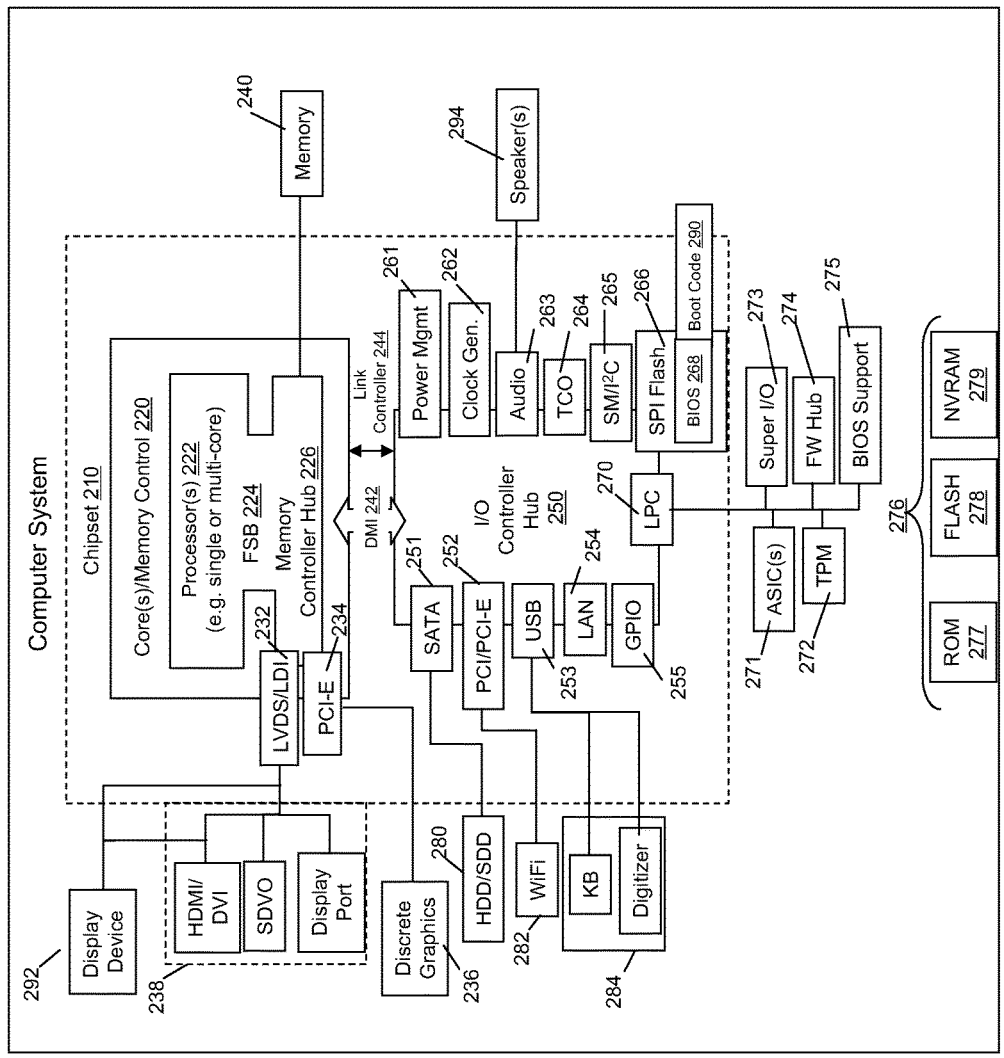
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries.

The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or other electronic devices. Users may employ these devices for various functions, e.g., inputting handwriting strokes as an input modality to an internet search application, an email application, a text messaging or instant messaging application, an e-signature application, inputting handwriting strokes to fillable forms, a drawing application, etc. For example, the circuitry outlined in FIG. 1 may be implemented in a tablet or smart phone embodiment, whereas the circuitry outlined in FIG. 2 may be implemented in a laptop personal computer embodiment. In each case, the device may include an input and display device, e.g., a touch screen or the like, which acts to accept ink strokes and provides visual displays of input characters, as well as components to convert handwritten characters or strokes into machine text, input strokes as graphics or images, convert ink strokes to gesture commands, and the like.

Figure 3C:
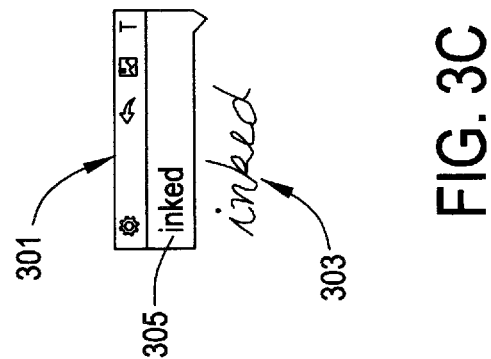
FIG. 3(A-C) illustrates an example of an undo operation for ink stroke conversion.
Figure 3B:
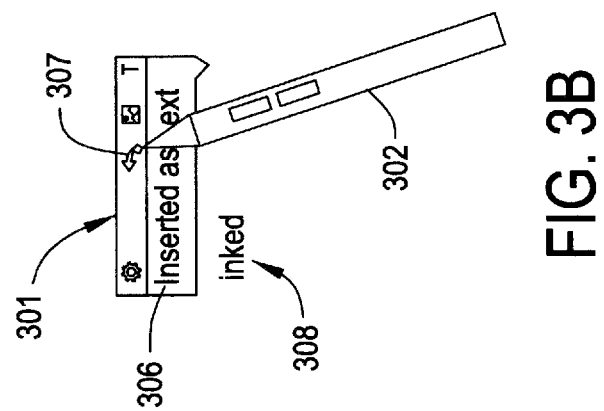
Figure 3A:
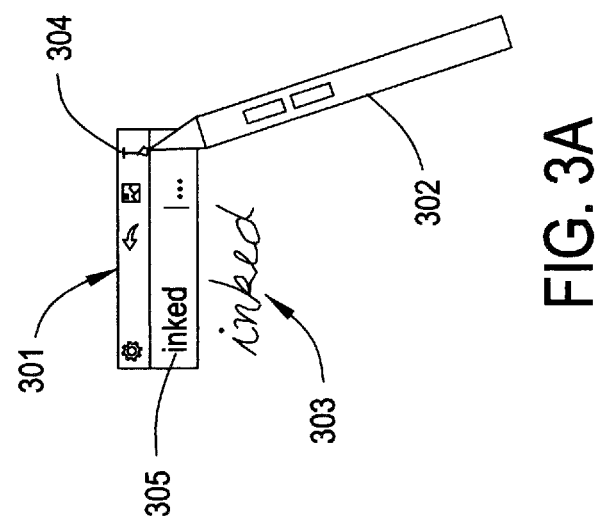

As illustrated in FIG. 3A, a user may input ink strokes 303 into an overlay input application using a pen 302. The overlay input application may display the ink strokes 303, e.g., on a touch screen display device. This allows the user to visually review the ink strokes 303 as detected and rendered by the input overlay application.

A bubble or window 301 may be provided, e.g., including a preview 305 of the typeset identified for conversion of the ink strokes 303. This typeset preview 305 indicates the input that will be provided to the underlying application (e.g., email application, web browser, etc.). As illustrated in FIG. 3A, a user may operate a soft control 304 to have the converted input previewed at 305 provided or input into the underlying application, as illustrated in FIG. 3B at 308. Thus the ink strokes 303 are converted into typeset input 308 for the underlying application by the overlay input application.

As described herein, and as illustrated by the example of FIG. 3B, an embodiment offers an option to the user to undo or revert to the ink strokes. That is, a user may operate a soft control 307 to revert to the prior ink strokes. Thus, if the user provides an input to soft control 307, e.g., using pen 302 as illustrated in FIG. 3B, or otherwise provides an input (e.g., keyboard shortcut keys such as CTRL+Z, or underlining of an application's undo soft control, etc.) an embodiment reverses typeset input 308 of the underlying application and re-presents the ink strokes 303 to the user, e.g., as illustrated in FIG. 3C. This permits the user to provide further ink strokes to the overlay input application. The user may re-convert the ink strokes (with or without additional ink strokes, e.g., to adjust or modify the prior ink strokes 303, with gesture or editing pen input, etc.). For example, the user need only provide input to soft control 304 to have the ink strokes 303 once again converted and input into the underlying application.

Figure 4:
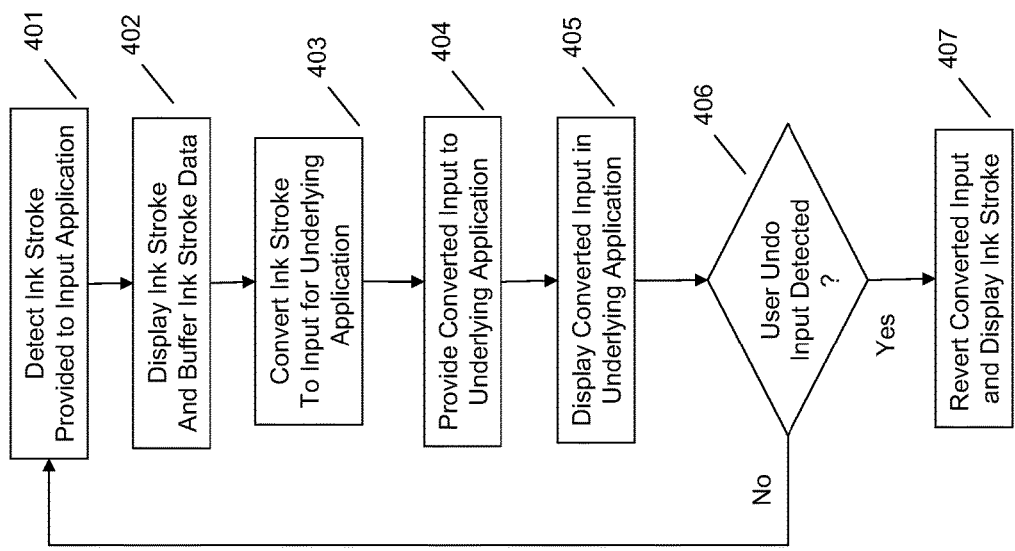
FIG. 4 illustrates an example method of an undo operation for ink stroke conversion.

FIG. 4 then illustrates an example method of an undo operation for ink stroke conversion. In the example illustrated, an embodiment detects, at an input and display device such as a touch screen, an ink stroke provided to an input overlay application at 401. These ink strokes may be provided in a display at 402. As described herein, the ink strokes may also be buffered or otherwise stored by an embodiment, e.g., for use in reverting. A particular amount or set of ink strokes may be stored, and this amount may be configured by the user or changed dynamically, e.g., based on the input style of the user.

If a user wishes to place or input the ink strokes into an underlying application, e.g., via operation of a soft control as illustrated in FIGS. 3A and 3B, an embodiment converts the ink stroke input into a converted input for an underlying application at 403 and provides the converted input to the underlying application at 404. This allows an embodiment to display the converted input in the underlying application at 405, e.g., as illustrated in FIG. 3B. The converted input may be typeset or a graphic.

If a user input associated with the converted input is detected at 406, e.g., a user input to a soft control 307 as illustrated in FIG. 3B, an embodiment reverts the converted input and displays the ink strokes on the input and display device at 407. Thus, as illustrated in FIG. 3C, an embodiment presents the prior ink strokes to the user in the overlay input application, e.g., for modification, addition, etc.

In an embodiment, the reverting includes removing the converted input from the underlying application and displaying the buffered ink stroke data in the input overlay application. This permits an embodiment to detect editing input in the input overlay application, where the editing input changes the ink strokes (e.g., adds thereto, removes there-from, etc.). The editing input may include an ink stroke, such as an additional character input using ink strokes, removal of a character by way of ink stroke interpreted as a gesture (e.g., line through gesture) and the like.

An ink bubble, e.g., 301, may be presented such that user input associated with the converted input is provided to the ink bubble. This may include one or more soft keys of the ink bubble, as illustrated by way of example in FIG. 3(A-C). It should be appreciated that the input overlay application operates with a plurality of underlying applications and furthermore that the input overlay application accepts ink input via an active stylus, passive implements (e.g., passive pen) or even finger input (for either ink strokes or soft key presses).

The various embodiments described herein thus represent a technical improvement to ink stroke applications in that an overlay input application is improved in its ability to buffer ink stroke input data and use the same to revert machine input (e.g., typeset) to prior ink strokes. The reverted ink strokes are those actually provided by the user, i.e., they are not machine rendered handwriting font mimicking the user's converted ink strokes. Using the techniques described herein, a user is permitted to be presented with prior ink inputs and may therefore provide disambiguating input(s) in-line such that convenient and intuitive switching between prior ink input and additional ink input is possible, even in applications where a dedicated ink input is not natively supported.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions that are executed by a processor and stored on a device readable storage medium, referred to herein as a non-signal storage device. A non-signal storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a non-signal storage device is not a signal, is non-transitory, and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a special purpose information handling device or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   accepting, at an input and display device, an ink stroke provided to an input overlay application, wherein the input overlay application operates in conjunction with, but is independent from, an underlying application;
   providing a display of the ink stroke on the input and display device;
   converting, responsive to receiving a user entry input in the input overlay application, the ink stroke input into machine text input for the underlying application and storing the ink stroke input;
   providing the machine text input to the underlying application;
   thereafter detecting a user reversion input in the input overlay application associated with the machine text input;
   removing the machine text input from the underlying application; and
   reverting to the ink stroke on the input and display device, wherein the reverting comprises accessing the stored ink stroke input corresponding to the machine text input and displaying the accessed ink stroke input in the input overlay application.

2. The method of claim 1, wherein the reverting comprises issuing a removal command to the underlying application to remove the converted input from the underlying application.

3. The method of claim 1, wherein the reverting comprises displaying the ink stroke in the input overlay application based on buffered ink stroke data, wherein the buffered ink stroke data comprises ink stroke data associated with the input style of the user.

4. The method of claim 3, further comprising receiving editing input in the input overlay application, wherein the editing input changes the ink stroke.

5. The method of claim 4, wherein the editing input comprises an ink stroke.

6. The method of claim 1, wherein the converted input is selected from the group consisting of a typeset and a graphic.

7. The method of claim 1, wherein the input overlay application operates with a plurality of underlying applications.

8. The method of claim 1, wherein the input overlay application accepts ink input via an active stylus.

9. The method of claim 1, further comprising displaying an ink bubble, wherein the user reversion input associated with the converted input is provided to the ink bubble.

10. The method of claim 9, wherein the user reversion input is provided to a soft key of the ink bubble.

11. An electronic device, comprising:
    an input and display device;
    a processor operatively coupled to the input and display device; and
    a memory that stores instructions executable by the processor to:
    accept, at the input and display device, an ink stroke provided to an input overlay application, wherein the input overlay application operates in conjunction with, but is independent from, an underlying application;
    provide a display of the ink stroke on the input and display device;
    convert, responsive to receiving a user entry input in the input overlay application, the ink stroke input into machine text input for the underlying application and storing the ink stroke input;
    provide the machine text input to the underlying application;
    thereafter detect a user reversion input in the input overlay application associated with the machine text input;
    removing the machine text input from the underlying application; and
    revert to the ink stroke on the input and display device, wherein the reverting comprises accessing the stored ink stroke input corresponding to the machine text input and display the accessed ink stroke input in the input overlay application.

12. The electronic device of claim 1, wherein to revert comprises issuing a removal command to the underlying application to remove the converted input from the underlying application.

13. The electronic device of claim 11, wherein to revert comprises displaying the ink stroke in the input overlay application based on buffered ink stroke data, wherein the buffered ink stroke data comprises ink stroke data associated with the input style of the user.

14. The electronic device of claim 13, wherein the instructions are executable by the processor to receive editing input in the input overlay application, wherein the editing input changes the ink stroke.

15. The electronic device of claim 14, wherein the editing input comprises an ink stroke.

16. The electronic device of claim 11, wherein the converted input is selected from the group consisting of a typeset and a graphic.

17. The electronic device of claim 11, wherein the input overlay application operates with a plurality of underlying applications.

18. The electronic device of claim 11, wherein the instructions are executable by the processor to display an ink bubble, wherein the user reversion input associated with the converted input is provided to the ink bubble.

19. The electronic device of claim 18, wherein the user reversion input is provided to a soft key of the ink bubble.

20. A product, comprising:
a storage device having code stored therewith, the code being executable by a processor of an electronic device and comprising:
code that accepts, at an input and display device, an ink stroke provided to an input overlay application, wherein the input overlay application operates in conjunction with, but is independent from, an underlying application;
code that provides a display of the ink stroke on the input and display device;
code that converts, responsive to receiving a user entry input in the input overlay application, the ink stroke input into machine text input for the underlying application and storing the ink stroke input;
code that provides the machine text input to the underlying application;
code that thereafter detects a user reversion input in the input overlay application associated with the machine text input;
code that removes the machine text input from the underlying application; and
code that reverts to the ink stroke on the input and display device, wherein the reverting comprises accessing the stored ink stroke input corresponding to the machine text input and displaying the accessed ink stroke input in the input overlay application.

* * * * *